Oct. 23, 1956
P. E. YACOBY
2,767,541
LAWN EDGER
Filed Feb. 28, 1955
2 Sheets-Sheet 1
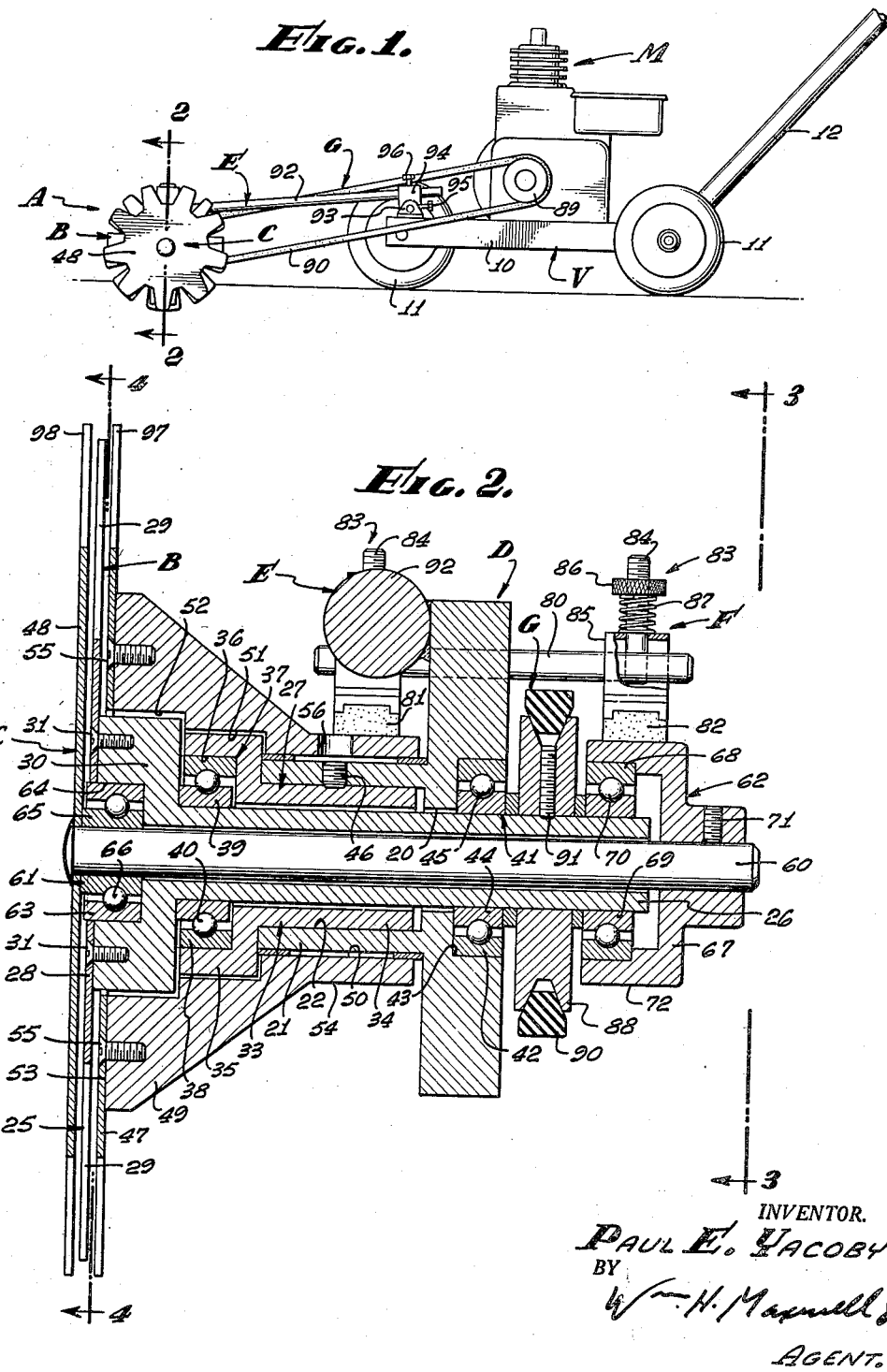
INVENTOR.
PAUL E. YACOBY
BY
Wm H. Maxwell Jr
AGENT.

Oct. 23, 1956  P. E. YACOBY  2,767,541
LAWN EDGER
Filed Feb. 28, 1955
2 Sheets-Sheet 2
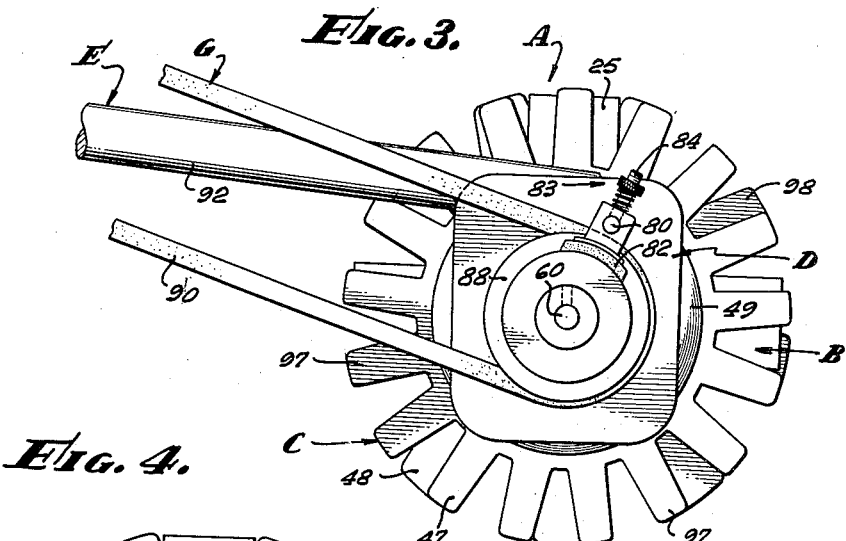
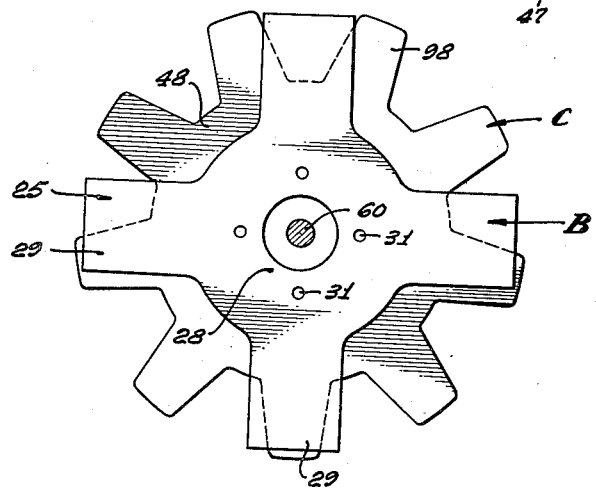
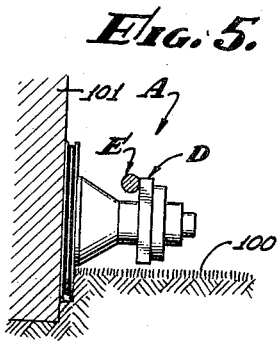
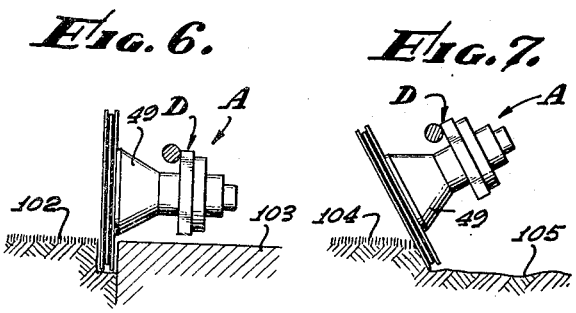
INVENTOR.
PAUL E. YACOBY
BY
W. H. Maxwell Jr.
AGENT.

United States Patent Office 2,767,541
Patented Oct. 23, 1956

2,767,541

LAWN EDGER

Paul E. Yacoby, Seal Beach, Calif.

Application February 28, 1955, Serial No. 491,087

13 Claims. (Cl. 56—25.4)

This invention has to do with a power operated edger for trimming and cutting the edges of lawns along flower beds, walls, driveways and the like.

It is an object of the present invention to provide an edger of the general character referred to that is in the form of an attachment that can be advantageously engaged on and driven by a piece of power equipment such as a power operated lawn mower, or the like.

Another object of the present invention is to provide an edger of the character referred to having a power driven rotating cutter and a pair of freely rotatable guards occurring at opposite sides of and protecting the cutter.

A further object of the present invention is to provide an edger of the general character referred to above wherein the cutter is a flat, unitary member having a plurality of cutting blades and the guards are flat star wheels, each rotatable relative to the other, and each provided with a different number of fingers.

It is another object of the present invention to provide an edger of the character referred to that can be advantageously tilted to bevel or under-cut the edge of a lawn.

It is still another object of the invention to provide an edger that will shear the lawn being cut and leave a neat, even edge on the lawn.

The various objects and features of my invention will be fully understood from the following detailed description of a typical preferred form and application of my invention, throughout which description reference is made to the accompanying drawings, in which:

Fig. 1 is a side elevational view of the edger that I provide and showing it applied to a wheeled vehicle carrying a prime mover or motor. Fig. 2 is an enlarged sectional view of the edger provided by the present invention and taken as indicated by line 2—2 on Fig. 1. Fig. 3 is a side elevational view of reduced size and taken as indicated by line 3—3 on Fig. 2. Fig. 4 is a sectional view of reduced size and taken as indicated by line 4—4 on Fig. 2. Fig. 5 is a diagrammatic view showing the edger provided by the present invention cutting a lawn adjacent a wall or the like. Fig. 6 is a diagrammatic view of my edger cutting a lawn adjacent a driveway or the like, and Fig. 7 is a diagrammatic view of my edger in a tilted position and cutting the edge of a lawn at an angle.

The edger provided by the present invention is in the nature of an attachment and can be advantageously engaged on and driven by any suitable piece of power operated gardening machinery, such as a lawn mower or the like.

In the particular case illustrated, I have shown my edger A engaged on a vehicle V, carrying a prime mover M and designed specifically to carry and drive edgers of the general type that I provide.

The particular vehicle illustrated is shown as including an elongate frame 10, on which the prime mover M is supported, wheels 11 supporting the frame and a handle 12 projecting rearwardly upwardly from the rear end of the frame and adapted to be engaged by the operator of the machine to move and guide the edger relative to a lawn.

It is to be understood that the particular vehicle shown and described above is not a part of the present invention and is only intended to illustrate one typical installation or application of my new edger.

The edger provided by the present invention includes, generally, a rotating cutting means B, rotating guard means C for the cutting means, a body D supporting the cutting means and the guard means, and mounting means E adapted to connect the body to a vehicle. The edger provided by the present invention further includes a suitable drive means G for the cutting means and adapted to connect with the prime mover on the vehicle to which my edger is related.

The body D that I provide is a flat, vertically disposed plate-like part with a horizontally disposed opening 20 extending through it from one side to the other and is provided with an elongate tubular boss-like projection 21 projecting laterally outwardly from one side thereof, concentric with the opening and defining an inwardly extending socket 22.

The cutting means B including, a cutter 25, a drive shaft 26, and supporting means 27 rotatably supporting the drive shaft in the body D.

The cutter 25 is a simple, flat, unitary member having a central hub portion 28 and a plurality of flat, circumferentially spaced radially outwardly projecting blades 29. The drive shaft 26 is an elongate horizontally disposed tubular member and extends through the opening 20 in the body to project laterally from both sides of the body. The drive shaft 26 is provided with an enlarged head portion 30 at one end thereof and to which the cutter 25 is fixed by means of suitable screw fasteners 31.

It will be seen from the drawings, that the drive shaft 26 projects freely through the socket 22 establishing the boss 21 on the body and that the enlarged head portion 30 occurs at the same side of the body from which the boss projects and is spaced outwardly therefrom.

The supporting means 27 rotatably supporting the drive shaft 26 in the body D includes, an elongate sleeve 33 with an inner portion 34 engaged in the socket 22 of the body in fixed relationship thereto and an enlarged outer portion 35 projecting radially outward from the boss 21 of the body and provided with a counterbore 36. A suitable antifriction bearing 37 is carried by the enlarged outer portion 35 of the sleeve 33 and includes, an outer race 38 engaged in the counterbore 36, an inner race 39 engaged on the drive shaft 26 and against the head portion 30 thereof, and an annular row of balls 40 between the races.

The supporting means 27 for the drive shaft 26 further includes, a second antifriction bearing 41, spaced longitudinally of the first mentioned bearing 37. The said second bearing is shown as including an outer race 42 engaged in a counterbore 43 extending the sides of the body D, opposite the boss 21, an inner race 44 engaged on the drive shaft 26 and an annular row of balls 45 between the races.

The sleeve 33 of the supporting means 27 for the drive shaft 26 is shown as being held in fixed position in the socket 22 by means of a suitable set screw 46 engaged in and extending through the wall of the boss 21 on the body A.

The guard means C for the cutting means B is shown as including, an inner star wheel 47 occurring adjacent the inner side of the cutter 25 and an outer star wheel 48 occurring adjacent the other or outer side of the cutter. The star wheels 47 and 48 are each freely rotatable relative to the cutter 25, the body D and to each other.

The inner star wheel 47 is carried by a suitable hub 49, which hub is engaged on and rotatably supported by the boss 21 of the body D. The hub 49 is shown as having a central bore 50 receiving the boss 21 of the body D, an intermediate enlarged counterbore 51 freely receiving the enlarged outer end portion 35 of the sleeve 33 of the drive shaft supporting means 27 and an outer enlarged counterbore 52 freely receiving the enlarged head portion 30 of the drive shaft 26.

The said outer head portion 30 of the shaft 26 and the enlarged outer portion 35 of the sleeve 30 occur within the counterbores 52 and 51 with running clearance, so that the hub 49 is supported wholly by the boss 21 and is maintained engaged thereon by the body D at one end of the boss and the said enlarged outer end portion 35 of the sleeve 33 at the other end, which enlarged portion projecting radially outwardly from the outer terminal end of the boss.

The outer portion of the hub 49, occurring around the head portion 30 of the drive shaft 26, is of substantial outside diameter and has a flat outwardly facing end 53 against which the inner star 47 is engaged, while the inner portion of the hub, occurring around the boss 21 of the body is of reduced diameter and establishes a straight, outer peripheral wall 54. The inner and outer portion of the hub 49, referred to above, are jointed to an outwardly divergent middle portion, which portion occurs around the enlarged outer portion 35 of the sleeve 33 of the shaft supporting means 27.

The star wheel 47 is shown secured to the outer face or end 53 of the hub 49 by means of suitable screw fasteners 55.

The reduced inner portion of the hub is shown provided with a suitable access opening 56 for the set screw 46 that is carried by the boss and engages and holds the sleeve 33 in fixed position in the socket 22 established by the boss.

The outer star wheel 48 is carried by a suitable counter shaft 60 that extends through the drive shaft 26 and which is rotatably carried by suitable bearing means 61 and 62 which are carried by the drive shaft 26 at its opposite ends.

The bearing means 61 at the outer enlarged end 30 of the drive shaft 26, rotatably supports the outer end of the counter shaft 60 and is shown as including, an outer race 63 engaged in an axially outwardly opening counterbore 64 in the end of the drive shaft, an inner race 65, on the counter shaft 60 and adjacent the star wheel 48, and an annular row of balls 66 between the races.

The bearing means 62 at the other end of the drive shaft 26 and rotatably supporting the other end of the counter shaft 60, is shown as including, a substantial cup-shaped bearing housing 67 secured to the end of the counter shaft and having a peripheral flange overlying the end of the drive shaft in spaced relationship thereto, an outer bearing race 68 carried by the housing with the flange, an inner race 69 engaged on the end of the drive shaft, and an annular row of balls 70 between the races.

The bearing housing 67 of the bearing means 62 is shown as having a central longitudinal opening receiving the counter shaft 60 and as being fixed to the counter shaft by means of a suitable seat screw 71, and is shown as being provided with a straight outer peripheral wall 72.

In the preferred form of the invention, suitable brake means F is provided for the guard means C and is adapted to control rotation of the star wheels 47 and 48 when the structure is operated. The brake means F in the form of the invention illustrated is shown as including, an elongate arm 80 carried by the body to project laterally from each side thereof, to overlie the inner straight portion 54 of the hub 49 and the outer wall 72 of the bearing housing 67, a brake shoe 81 engageable on the outer wall 54 of the hub, a brake shoe 82 engageable on the outer wall 72 of the bearing housing, and adjustable resilient coupling means 83 between the arm 80 and each brake shoe and adapted to normally yieldingly urge the shoes into pressure engagement on the hub and the bearing housing. In the particular case illustrated, each brake coupling means 83 is shown as including, a threaded stem 84 carried by the rod 80 in fixed position thereon, a substantially U-shaped bracket 85 on the brake shoe to occur around the rod and having an opening therein passing the stem on the rod, an adjustable nut 86 on the stem, outward of the bracket, and a compression spring 87 between the nut and the bracket.

With the structure set forth above, it will be apparent that the braking means F can be advantageously adjusted to prevent rotation of the star wheels 48 and 47 as a result of frictional drag between the relatively moving parts, when the edger is in operation, yet permit the star wheels to walk or roll along and/or through the lawn as the edger is advanced or moved therealong and therethrough.

The drive means G adapted to establish driving connection between the cutter 25 and the prime mover M, carried by the vehicle V, is shown as including a pulley wheel 88 on the drive shaft 26 between the bearing means 67 on the drive shaft and the body, a pulley wheel 89 on the drive shaft of the prime mover M, and a belt 90 engaged on and extending between the pulleys.

The pulley wheel 88 is shown fixed on the drive shaft by means of a suitable seat screw 91.

The mounting means E adapted to connect the edger A to the vehicle V is shown as including, an elongate support arm 92 fixed on and projecting substantially rearwardly from the body D, a clevis plate 93 fixed to the frame 10 of the vehicle, a block 94 pivotally carried by the plate and slidably receiving the arm 92, and suitable lock bolts 95 and 96 are carried by the clevis plate 93 and block 94 to lock the arm block and plate in fixed position relative to each other.

With the above relationship of parts, it will be seen that by loosening the lock bolt 95 and 96 of the mounting means E, the arm 92 of the mounting means can be pivoted, shifted longitudinally and rotate relative to the vehicle, with the result that the edger can be shifted vertically longitudinally, and can be tilted, relative to the vehicle and to the lawn, as circumstances require.

It is to be understood that, in practice, any suitable mounting means can be provided to fix my edger to the piece of equipment with which it is to be related, and that particular means described above and illustrated in the drawings is only one preferred form of mounting means contemplated.

The star wheels 47 and 48 serve to protect the sides of the cutter 25 and also act as spacers to prevent the outer periphery of the cutter from engaging hard surfaces, such as a concrete driveway, and walls, as well as large rocks, which the edger might be brought into contact with when in use.

In practice, only one of the star wheels need be such as to protect one side of the cutter and also maintain the outer periphery of the cutter clear of walls or the like, while the other star wheel need only serve to protect the other side of the cutter.

In the particular case illustrated, the inner star wheel 47 is provided with seventeen circumferentially spaced, radially projecting fingers 97. The fingers 97 are spaced so that when a blade 29 of the cutter 25 passes the spaces between the adjacent fingers, the outer terminal end of the blade is radially inward of the outer terminal ends of the fingers.

With the above relationship of parts, it will be apparent that when the edger A is moved across a driveway or against a wall, or other like hard surface, the fingers 97 of the inner star wheel 47 maintain the blades 29 of the cutter 25, spaced from the said surface and thereby prevent the said surface and/or the blades from being damaged.

The outer star wheel 48 is shown provided with nine circumferentially spaced, radially outwardly projecting fingers 98, which fingers serve to protect the outer side of the cutter 25, when the outer side of the edger is engaged against a wall or the like.

It will be apparent from the foregoing, that when my edger is in operation, the star wheels 47 and 48, in addition to guarding the cutter 25, also serve to control the cutter action of the cutter by, in effect, shoring up the sod and soil and the sides of the cutter as it is rotated and advanced therethrough and with the result that a clean, and even, cutting action is provided.

In Fig. 5 of the drawings, I have shown the edger A provided by the present invention, cutting a lawn 100 adjacent a wall 101. In Fig. 6 I have shown my edger A engaging and cutting a lawn 102 adjacent a side walk 103. In Fig. 7 I have shown my edger A in a tilted position and cutting the edge of a lawn 104, adjacent a flower bed 105, at an angle.

Having described only a typical form and application of my invention, I do not wish to be limited or restricted to the specific details herein set forth, but wish to reserve to myself any variations or modifications that may appear to those skilled in the art and fall within the scope of the following claims.

Having described my invention, I claim:

1. An edger of the character described including, a body, a tubular drive shaft rotatably carried by the body and projecting from the sides thereof, a cutter blade carried by the drive shaft at one end thereof, an elongate freely rotatable counter shaft extending through the drive shaft and projecting from the ends thereof, an outer star wheel carried by the counter shaft to occur adjacent one side of the cutter, a hub freely rotatably carried by the body, an inner star wheel carried by the hub to occur adjacent the other side of the cutter, and drive means connected with the drive shaft to rotate the drive shaft and the cutter relative to the body and to the star wheels.

2. An edger attachment adapted to be related to a wheeled vehicle having a frame and supporting a prime mover including, a flat vertically disposed body, a mounting arm projecting rearwardly from the body and adapted to connect with the frame of the vehicle mover, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, and drive means adapted to rotate the cutter relative to the body and to the star wheels and including, a pulley wheel on the drive shaft at the other side of the body, a pulley wheel on the prime mover, and a belt engaged with the pulley wheels.

3. An edger attachment adapted to be engaged with a wheeled vehicle having a frame and carrying a prime mover including, a flat vertically disposed body, a mounting arm projecting rearwardly from the body and adapted to connect with the frame of the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, and drive means adapted to rotate the cutter relative to the body and to the star wheels and including, a pulley wheel on the drive shaft at the other side of the body, a pulley wheel on the prime mover, and a belt engageable with the pulley wheels, the star wheels being larger in diameter than the cutter.

4. An edger attachment adapted to be engaged with a vehicle carrying a prime mover including, a flat vertically disposed body, a mounting arm projecting rearwardly from the body and adapted to connect with the vehicle prime mover, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof, and surrounding the drive shaft, an inner star wheel carried by the hub to occur adjacent the other side of the cutter, and drive means between the prime mover and the drive shaft to rotate the cutter relative to the body and to the star wheels, one of the star wheels being larger in diameter than the cutter so that the cutter occurs radially inward of the cord line between the adjacent fingers of the star wheel.

5. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, and drive means between the prime mover and the drive shaft and adapted to rotate the cutter relative to the body and to the star wheels, the drive means including, a drive pulley on the prime mover, a driven pulley on the drive shaft and a belt engaged with the pulleys.

6. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof, and surrounding the drive shaft, an inner star wheel carried by the hub to occur adjacent the other side of the cutter, and drive means between the prime mover and the drive shaft and adapted to rotate the cutter relative to the body and to the star wheels, one of the star wheels being larger in diameter than the cutter so that the cutter occurs radially inward of the cord line between the adjacent fingers of the star wheel, the drive means including, a drive pulley on the prime mover, a driven pulley on the drive shaft at the other side of the body and a belt engaged with the pulleys.

7. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, drive means between the prime mover on the vehicle and the drive shaft and adapted to rotate the cutter relative to the body and to the star wheels, and brake means carried by the body and engaging the hub and the counter shaft to control the rotation of the star wheels.

8. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, drive means between the prime mover on the vehicle and the drive shaft and adapted to rotate the cutter relative to the body and to the star wheels, a brake means carried by the body and engaging the hub and the counter shaft to control the rotation of the star wheels, one of the star wheels being larger in diameter than the cutter so that the cutter occurs radially inward of the cord line between the adjacent fingers of the star wheel.

9. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, drive means between the prime mover carried by the vehicle and the drive shaft and adapted to rotate the cutter relative to the body and to the star wheels, a brake means carried by the body and engaging the hub and the counter shaft to control the rotation of the star wheels, the drive means including, a drive pulley on the prime mover, a driven pulley on the drive shaft and a belt engaged with the pulleys.

10. An edger attachment adapted to be engaged with a wheeled vehicle including, a flat vertically disposed body, a mounting arm projecting rearwardly from the body and adapted to connect with the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, drive means between the prime mover and the drive shaft and adapted to rotate the cutter relative to the body and the star wheels, a brake means carried by the body and engaging the hub and the counter shaft to control the rotation of the star wheels, one of the star wheels being larger in diameter than the cutter so that the cutter occurs radially inward of the cord line between the adjacent fingers of the star wheel, the drive means including, a drive pulley on the prime mover, a driven pulley on the drive shaft and a belt engaged with the pulleys.

11. An edger attachment adapted to be engaged with a wheeled vehicle including, a flat vertically disposed body, a mounting arm projecting rearwardly from the body, mounting means securing the arm to the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, and drive means between the prime mover and the drive shaft and adapted to rotate the cutter relative to the body and to the star wheels, said mounting means including, a clevis plate secured to the vehicle, a block pivotally carried by the plate and slidably and rotatably receiving the arm, and set screws in the plate and in the block to set the arm, block and plate in fixed position.

12. An edger attachment adapted to be engaged with a wheeled vehicle including, a flat vertically disposed body, a mounting arm projecting rearwardly from the body, mounting means securing the arm to the vehicle, an elongate tubular drive shaft rotatably carried by the body and projecting laterally from the sides thereof, a flat blade-like cutter carried by the drive shaft at one end thereof, an elongate counter shaft extending through and rotatably carried by the drive shaft, an outer star wheel carried by the counter shaft to occur adjacent one side of the cutter, a hub rotatably carried by the body at one side thereof and surrounding the drive shaft, an inner star wheel carried by the hub to occur adjacent the other side of the cutter, and drive means between the prime mover and the drive shaft and adapted to rotate the cutter relative to the body and to the star wheels, one of the star wheels being larger in diameter than the cutter so that the cutter occurs radially inward of cord line between the adjacent fingers of the star wheel, said mounting means including, a clevis plate secured to the vehicle, a block pivotally carried by the plate and slidably and rotatably receiving the arm, and set screws in the plate and in the block to set the arm, block and plate in fixed position, the drive means including, a drive pulley on the prime mover, a driven pulley on the drive shaft and a belt engaged with the pulleys.

13. A lawn edger including, a body, a drive shaft rotatably carried by the body, a rotating cutter carried by the drive shaft at one side of the body and having a plurality of circumferentially spaced radially outwardly projecting cutting blades, and guard means for the cutter including a freely rotatable star wheel having a plurality of radially outwardly projecting fingers adjacent each side of the cutter, means rotatably connecting the star wheel occurring between the body and the cutter to the body, means rotatably mounting the other star wheel to the drive shaft, one star wheel having more fingers than the other and being of sufficient diameter so that the cord line between the outer ends of the adjacent fingers is radially outward of the ends of the cutter blades.

References Cited in the file of this patent

UNITED STATES PATENTS

| | | |
|---|---|---|
| 2,630,669 | Hurd | Mar. 10, 1953 |
| 2,663,137 | Asbury | Dec. 22, 1953 |